3,261,803
ORGANOSILOXANES VULCANIZED WITH HEXYLENE GLYCOL BENZOATE PERBENZOATE

Edward Terence Naughton, Rumney, Cardiff, Glamorgan, Wales, assignor to Midland Silicones Limited, London, England
No drawing. Filed Apr. 24, 1964, Ser. No. 362,468
Claims priority, application Great Britain, May 3, 1963, 17,583/63
11 Claims. (Cl. 260—37)

This invention relates to novel vulcanizable silicone rubber stocks based on organosiloxane polymers and to silicone elastomers obtained by vulcanizing such stocks.

Organic peroxides, which term is to be understood as including per-esters, have become well-known vulcanizing agents for silicone rubber stocks. Compounds such as benzoyl peroxide, various halogenobenzoyl peroxides, tertiary butyl peracetate, tertiary butyl perbenzoate and dicumyl peroxide have been employed as vulcanizing agents in silicone rubber stocks for some years. Most peroxides of this type are satisfactory as vulcanizing agents for silicone rubber stocks only when vulcanization is carried out under the action of both heat and pressure. When the silicone rubber stock must be vulcanized in the absence of pressure under the action of heat alone, the choice of peroxide vulcanizing agents has been extremely limited. To date, only dichlorobenzoyl peroxide and under certain circumstances monochlorobenzoyl peroxides have been found to give satisfactory vulcanization for silicone rubber stocks in the absence of pressure under techniques generally known at hot air vulcanization.

It is an object of the present invention to introduce a novel organic peroxide suitable for use as a vulcanizing agent in silicone rubber stocks. A further object is the introduction of a novel silicone rubber stock which will vulcanize to form satisfactory elastomeric products under the action of heat alone. A hot air vulcanizing silicone rubber stock containing a novel peroxide vulcanizing agent is also an object of this invention. Other objects and advantages of this invention are detailed in or will be apparent from the disclosure and claims which follow.

The present invention relates to the use of hexylene glycol benzoate perbenzoate as a vulcanizing agent in silicone rubber stocks.

The silicone rubber stocks employed herein are well-known compositions based on an essentially linear diorganosiloxane polymer or copolymer together with fillers, pigments, compression set additives, plasticizers, stabilizers and crepe hardening additives well known in the art. (See, for example, U.S. Patent No. 2,723,966, issued Nov. 15, 1955.) The siloxane polymer, which is the basis for the silicone rubber, is a substantially linear polymer or copolymer consisting essentially of units of the formula $R_2SiO$ with less than 2 mol percent of other units of the formulae $RSiO_{3/2}$, $R_3SiO_{1/2}$ and/or $SiO_{4/2}$ being tolerated. Generally, the polymers are defined by the unit formula $R_nSiO_{4-n/2}$, where R is an organic substituent preferably monovalent hydrocarbon, or substituted hydrocarbon radicals and $n$ has a value of from 1.95 to 2.05, preferably 1.99 to 2.01. The substituents represented by R are widely described in the literature and include monovalent hydrocarbon radicals such as alkyl radicals, e.g. methyl, ethyl, propyl and octadecyl; alkenyl radicals, e.g. vinyl, allyl and hexenyl radicals; cycloaliphatic radicals, e.g. cyclohexyl, cyclopentyl, cyclohexenyl and cyclobutenyl; aralkyl radicals, e.g. benzyl and phenylethyl; and aromatic hydrocarbon radicals, e.g. phenyl, tolyl, xylyl, naphthyl, xenyl and phenanthryl. Additionally, R can be any halogenated monovalent hydrocarbon radical such as chloromethyl, pentafluorobutyl, trifluorovinyl, chlorophenyl, bromophenyl, alpha,alpha,-alpha-trifluorotolyl, bromoxenyl, chlorotrifluorocyclobutyl, chlorocyclohexyl and iodophenyl. R can also be a cyanoalkyl radical such as cyanoethyl, cyanopropyl and cyanooctadecyl. The preferred organic substituents represented by R are methyl, phenyl, vinyl and 3,3,3-trifluoropropyl radicals and it is further preferred that at least 50 percent of the radicals represented by R are methyl radicals. A further preference is that the presence of vinyl radicals be restricted to less than about 1 percent of the total number of R groups present.

It is apparent that in the siloxane polymers described above all of the R groups can be the same as in a dimethylsiloxane homopolymer. All of the units in the siloxane polymer can be the same as in an essentially linear phenylmethylsiloxane. Copolymeric siloxanes are also operative and can be illustrated by copolymers of phenylmethylsiloxane units, dimethylsiloxane units, and vinyldimethylsiloxane endblockers. Illustrative of the siloxane polymers operative herein are dimethylsiloxanes, copolymers of 99 mol percent dimethylsiloxane and 1 mol percent methylvinylsiloxane, copolymers of 90 to 98 mol percent dimethylsiloxane and 2 to 10 mol percent phenylmethylsiloxane, copolymers of up to 5 mol percent diphenylsiloxane, 95 mol percent dimethylsiloxane and up to 1 mol percent methylvinylsiloxane as well as copolymers of dimethylsiloxane and 3,3,3-trifluoropropylmethylsiloxane. The foregoing siloxane polymers can be endblocked with trimethylsiloxane units, dimethylvinylsiloxane units, hydroxyl groups, chlorine atoms, and a substantial number of other endblocking units well known in the art and present in small proportions.

The siloxane polymer employed herein is soluble in organic solvents and is preferably highly polymerized to a gum-like state but fluid materials having viscosities as low as 50,000 cs. at 25° C. can be employed when circumstances require the use of a low viscosity siloxane. Preferred polymers having viscosities from 500,000 to $10^7$ cs. at 25° C.

The siloxane polymer is admixed with any of the well-known fillers employed in the silicone rubber art. Examples of such fillers include silicas, glass fibers, glass flock, metal oxides, and a whole host of other inert fibrous and particulated materials well known as fillers in the silicone rubber art. See, for example, the fillers listed in U.S. Patents 3,086,954; 3,070,560; 3,070,555; 3,065,201; 3,061,575 etc.

As noted above, the silicone rubber stocks employed herein can also contain pigments, compression set additives, plasticizers and other materials well known for use in silicone rubber stocks. The polymer, filler and other additives are employed in standard proportions. For example, for 100 parts per weight of siloxane polymer, the filler can be present in amounts varying from 10 parts to 200 parts by weight and when a reinforcing silica filler is employed the preferred proportions are 20 to 80 parts filler per 100 parts by weight polymer. In accordance with U.S. Patent No. 2,890,188, various crepe-aging additives can be employed in the stocks of this invention.

The novel vulcanizing agent of this invention is hexylene glycol benzoate perbenzoate. This compound is a white crystalline solid and is preferably employed in the compositions of this invention in the form of a paste or as a solution in a suitable solvent. In the paste or solution form, the compound is more easily dispersed through the vulcanizable silicone rubber stock during the mixing and/or milling steps thereby avoiding the well-known disadvantages resulting from local concentrations of the vulcanizing agent through the silicone rubber stock.

Vulcanization of the silicone rubber stocks containing the hexylene glycol benzoate perbenzoate can be brought about by exposing the compositions to the action of heat alone or of both heat and pressure. The time and temperature required to bring about vulcanization will vary between wide limits depending, for example, on the vulcanization technique employed. Hot air vulcanization of the compositions will, in general, require a higher temperature and/or a longer period of time than if the vulcanization is to be carried out under the action of both heat and pressure. Generally, a temperature of 110° C. to 175° C. is required when pressure is employed and a temperature of from 165° to 275° C. is required when hot-air vulcanizing techniques are employed.

The times and temperatures employed for vulcanizing the silicone rubber stocks of this invention are those commonly employed in the art and are illustrated by the various patents to which reference is made throughout this application.

Satisfactory vulcanization can be obtained by incorporating in the silicone rubber stock up to 10 parts by weight of the hexylene glycol benzoate perbenzoate for each 100 parts by weight of organosiloxane polymer present. As little as 0.1 part of the vulcanizing agent will result in a cross-linked elastomeric product but it is preferred to employ at least .5 part by weight of the vulcanizing agent and employing greater than 4 parts by weight appears to be wasteful. Accordingly, the preferred range of proportions of the vulcanizing agent for each 100 parts by weight of siloxane polymer is from .5 to 4 parts by weight.

The silicone rubber stocks of this invention are useful in the myriad of uses well known for silicone rubber. Preparation of gaskets, formed rubber pieces, molded materials and other elastomeric products well known in the art can be carried forward employing the silicone rubber stocks of this invention.

The invention is illustrated by the following examples. The scope of the invention is delineated in the claims and is not restricted by the examples. All parts and percentages in the examples are based on weight unless otherwise provided and all viscosities are measured at 25° C. The measurements of physical properties were carried out in accordance with standard testing methods developed and/or approved by the British Standards Institution, London, England.

*Example 1*

A high viscosity copolymeric gum comprising a dimethylpolysiloxane containing 0.15 mol percent of methylvinylsiloxane was prepared by the alkali catalysed equilibration of cyclic dimethylsiloxanes with cyclic methylvinylsiloxanes. The gum was then devolatilized by heating it to a temperature of 180° C. for a period of 4 hours and then employed to make a base stock having the formulation:

| | Parts |
|---|---|
| Siloxane gum | 100 |
| Reinforcing silica (surface area approx. 300 m.²/g.) | 35 |
| Additive [1] | 7 |

[1] The additive was a mixture of low molecular weight hydroxylated dimethylpolysiloxanes containing from about 12 to about 20 dimethylsiloxane units per molecule.

Samples of the base stock were compounded with various quantities of the vulcanizing agent and were identified under the letters A to D. Stocks A, B, C and D contained 0.5, 1.0, 2.0 and 3.0 parts respectively of hexylene glycol benzoate perbenzoate per 100 parts of the siloxane gum added in the form of a stiff paste in a liquid dimethylpolysiloxane.

The compounded stocks were then vulcanized by heating in a mould for the times shown in the table below. The physical properties of the vulcanized elastomers were measured according to the procedures described in British Standards 903: 1950 following the press cure and following post curing in an oven for 24 hours and 7 days at 250° C. The results obtained are given in the following table wherein T.S. denotes the tensile strength in pounds per square inch, E$b$ denotes the percentage elongation at break and H signifies the hardness in B.S.°.

| Stock | Press Cure, Time/Temp. | Physical Properties ||||||||
|---|---|---|---|---|---|---|---|---|---|
| | | Press Cure ||| 24 Hr. Post Cure at 250° ||| 7 days Post Cure at 250° |||
| | | T.S. | E$b$ | H | T.S. | E$b$ | H | T.S. | E$b$ | H |
| A | 6 mins./135° C | 970 | 800 | 38 | 860 | 500 | 42 | 500 | 60 | 76 |
| B | 4½ mins./135° C | 960 | 700 | 42 | 840 | 360 | 50 | 480 | 50 | 79 |
| C | 4½ mins./135° C | 900 | 570 | 47 | 790 | 240 | 58 | 570 | 60 | 74 |
| D | 4½ mins./135° C | 890 | 580 | 44 | 730 | 160 | 65 | 620 | 60 | 77 |

*Example 2*

A base stock identical with that employed in Example 1 was compounded with 3.0 parts per 100 parts of the siloxane gum of hexylene glycol benzoate perbenzoate employed in the form of a stiff paste in a dimethylsiloxane polymer. The compounded stock was then extruded in the form of thin walled tube of ½" outside diameter and ⅜" internal diameter and in the form of a solid rod, and the tube and rod samples placed in an oven at 250° C. When removed from the oven after a period of 2 minutes the samples had vulcanized to elastomers.

*Example 3*

A vulcanizable composition was prepared by compounding 100 parts of a high viscosity siloxane gum which was a copolymer of 92 mol percent dimethylpolysiloxane, 7 mol percent phenylmethylpolysiloxane and 1 mol percent methylvinylpolysiloxane, 35 parts of a reinforcing fume silica, 9.5 parts of a hydroxylated, low molecular weight polydimethylsiloxane, 4.0 parts of iron oxide and 1.0 part of hexylene glycol benzoate perbenzoate added as a paste in a liquid polydimethylsiloxane, all quantities being parts by weight.

The compounded stock was vulcanized by heating in a mould under pressure at 135° C. for 6 minutes. The physical properties of the vulcanized elastomer were measured as described in Example 1 except that a six day post cure replaced the seven day cure of that example. On testing, the stock exhibited the following physical properties.

| Cure | T.S. | E$b$ | H |
|---|---|---|---|
| 6 mins. at 135° C | 875 | 625 | 32 |
| 24 hrs. post cure at 250° C | 715 | 305 | 42 |
| 6 days post cure at 250° C | 720 | 230 | 49 |

*Example 4*

A stock was compounded employing 100 parts of a dimethylpolysiloxane gum, 35 parts of a reinforcing fume silica, 15 parts of a diatomaceous earth, 9.0 parts of a hydroxylated low molecular weight dimethylpolysiloxane, 2.0 parts of zinc oxide and 3.0 parts of hexylene glycol benzoate perbenzoate.

After the stock had been vulcanized under pressure in a mould at 135° C. for 6 minutes it was found to have a tensile strength of 560 lb. per sq. in., a percentage elongation at break of 1050 and a hardness of 22 B.S.° when measured according to British Standards 903:1950.

Example 5

Equivalent silicone rubber stocks were achieved when the Example 1 was repeated employing any of the following polymers and copolymers:

| | Cs. |
|---|---|
| (A) 3,3,3-trifluoropropylmethylsiloxane | $10^6$ |
| (B) dimethylsiloxane | $10^5$ |
| (C) 95 mol percent dimethylsiloxane–4.8 mol percent diphenylsiloxane–0.2 mol percent vinyldimethylsiloxane | $.6$–$2.0 \times 10^6$ |
| (D) 40 mol percent 3,3,3-trifluoropropylmethylsiloxane–59.8 mol percent dimethylsiloxane–0.2 mol percent vinyldimethylsiloxane | $.6$–$2.0 \times 10^6$ |
| (E) 80 mol percent dimethylsiloxane–20 mol percent cyanoethylmethylsiloxane | $.5 \times 10^6$ |

That which is claimed is:

1. In a silicone rubber stock the improvement consisting of incorporating therein as a vulcanizing agent from 0.1–10 parts by weight per 100 parts by weight of organosiloxane polymer in said rubber stock, the compound hexylene glycol benzoate perbenzoate.

2. A silicone rubber stock consisting essentially of 100 parts by weight of an essentially linear, diorganosiloxane polymer of at least 50,000 cs. viscosity at 25° C. wherein the monovalent organic substituents are selected from the group consisting of hydrocarbon radicals containing from 1–18 carbon atoms, halogenohydrocarbon radicals containing from 1–8 carbon atoms and cyanoalkyl radicals containing from 1–18 carbon atoms, a filler and 0.1 to 10 parts by weight of hexylene glycol benzoate perbenzoate.

3. The silicone rubber stock of claim 2 wherein the siloxane polymer has the unit formula $R_nSiO_{4-n/2}$, where each R is selected from the group consisting of hydrocarbon radicals containing from 1–18 carbon atoms, halogenohydrocarbon radicals containing from 1–8 carbon atoms and cyanoalkyl radicals containing from 1–18 carbon atoms and $n$ has an average value from 1.99 to 2.01.

4. The silicone rubber stock of claim 3 wherein the filler is a reinforcing silica.

5. The silicone rubber stock of claim 4 further characterized in that it contains a crepe aging additive.

6. A vulcanizable silicone rubber stock consisting essentially of 100 parts by weight of an essentially linear siloxane polymer of the unit formula $R_nSiO_{4-n/2}$, wherein each R is a monovalent radical selected from the group consisting of hydrocarbon radicals containing from 1–18 carbon atoms, halogenohydrocarbon radicals containing from 1–8 carbon atoms and cyanoalkyl radicals containing from 1–18 carbon atoms, $n$ has an average value of from 1.99 to 2.01 having a viscosity of from 500,000 to $10^7$ cs. at 25° C., a filler, and 0.5 to 4 parts by weight of hexylene glycol benzoate perbenzoate.

7. The silicone rubber stock of claim 6 wherein the filler is a reinforcing silica filler.

8. The method of vulcanizing silicone rubber stocks comprising heating the silicone rubber stock of claim 1 to a temperature in the range 165° C. to 275° C.

9. The method of vulcanizing the silicone rubber stocks of claim 1 comprising heating said stocks under superatmospheric pressure at a temperature in the range of 110° to 175° C.

10. A silicone rubber prepared by vulcanizing the silicone rubber stock of claim 1.

11. A method of producing siloxane elastomers which comprises heating a silicone rubber stock consisting essentially of 100 parts by weight of an essentially linear, diorganosiloxane polymer of at least 50,000 cs. viscosity at 25° C. wherein the monovalent organic substituents are selected from the group consisting of hydrocarbon radicals containing from 1–18 carbon atoms, halogenohydrocarbon radicals containing from 1–8 carbon atoms and cyanoalkyl radicals containing from 1–18 carbon atoms, a filler, and 0.1 to 10 parts by weight of hexylene glycol benzoate, at a temperature of from 165° C. to 275° C., whereby vulcanization of the siloxane without bubbling is obtained.

References Cited by the Examiner

UNITED STATES PATENTS

| 2,560,498 | 7/1951 | Warrick | 260—46.5 |
| 2,709,161 | 5/1955 | Kilbourne | 260—46.5 |
| 2,723,966 | 11/1955 | Youngs | 260—46.5 |
| 2,890,188 | 6/1959 | Konkle | 260—46.5 |
| 3,109,826 | 11/1963 | Smith | 260—46.5 |
| 3,110,689 | 11/1963 | Smith | 260—46.5 |

FOREIGN PATENTS

| 1,019,462 | 11/1957 | Germany. |
| 1,076,941 | 3/1960 | Germany. |

LEON J. BERCOVITZ, *Primary Examiner.*

F. McKELVEY, *Assistant Examiner.*